US011995496B1

(12) United States Patent
Mars et al.

(10) Patent No.: US 11,995,496 B1
(45) Date of Patent: May 28, 2024

(54) DISPLAY READER DEVICE AND METHODS

(71) Applicant: OURARING INC., San Francisco, CA (US)

(72) Inventors: Denis Mars, San Francisco, CA (US); Simon Ratner, San Francisco, CA (US)

(73) Assignee: Ouraring, Inc., San Francisco, CA (US)

( * ) Notice: Subject to any disclaimer, the term of this patent is extended or adjusted under 35 U.S.C. 154(b) by 114 days.

(21) Appl. No.: 17/878,785

(22) Filed: Aug. 1, 2022

Related U.S. Application Data

(60) Provisional application No. 63/227,950, filed on Jul. 30, 2021, provisional application No. 63/227,965, filed on Jul. 30, 2021.

(51) Int. Cl.
| | |
|---|---|
| *G06K 7/00* | (2006.01) |
| *G06F 21/32* | (2013.01) |
| *G06K 7/10* | (2006.01) |
| *H04W 4/80* | (2018.01) |

(52) U.S. Cl.
CPC .......... *G06K 7/0065* (2013.01); *G06F 21/32* (2013.01); *G06K 7/10366* (2013.01); *H04W 4/80* (2018.02)

(58) Field of Classification Search
CPC ........ G06K 7/0065; H04W 4/80; G06F 21/32
USPC .............................................. 235/380; 727/7
See application file for complete search history.

(56) References Cited

U.S. PATENT DOCUMENTS

| | | | | |
|---|---|---|---|---|
| 11,727,437 | B2 * | 8/2023 | Heeter | G06Q 30/018 |
| | | | | 235/487 |
| 11,770,197 | B2 * | 9/2023 | Zhang | H04B 17/309 |
| | | | | 382/103 |
| 11,863,707 | B2 * | 1/2024 | Bohannon | H04M 3/5231 |
| 2002/0140625 | A1 * | 10/2002 | Kidney | G06F 3/0481 |
| | | | | 345/1.1 |
| 2017/0213445 | A1 * | 7/2017 | Kusens | G08B 25/016 |
| 2018/0352583 | A1 * | 12/2018 | Smith | H04W 4/80 |
| 2020/0143125 | A1 * | 5/2020 | Mars | H04B 10/1149 |
| 2021/0350646 | A1 * | 11/2021 | Burroughs | G07C 9/00571 |
| 2022/0245671 | A1 * | 8/2022 | Heeter | H04W 12/77 |
| 2023/0195146 | A1 * | 6/2023 | Zheng | D06F 25/00 |
| | | | | 62/159 |

* cited by examiner

*Primary Examiner* — Allyson N Trail
(74) *Attorney, Agent, or Firm* — Holland & Hart LLP

(57) ABSTRACT

An identity reader device includes a short-range transceiver for outputting an advertisement signal to a smart device, and for receiving an ephemeral ID from the smart device, wherein the ephemeral ID is not permanently associated with a user of the smart device, a network interface for providing the first ephemeral ID to a remote authentication service, and for receiving responsive data from the remote authentication service, a visual display for display one or more graphical user interfaces, and a processor for directing the visual display to display a first GUI to the user, in response to the responsive data, for determining whether the user is authorized, and for directing output of a physical action, in response to determining that the user is authorized.

20 Claims, 7 Drawing Sheets

"Welcome Hannah, your 10 O'clock appointment has checked-in."

"Entrance granted to Denis Mars' TED Talk about Personal Identity Management."

"Welcome Hannah, your 10 O'clock appointment has checked-in."

"Entrance granted to Denis Mars' TED Talk about Personal Identity Management."

FIG. 1A

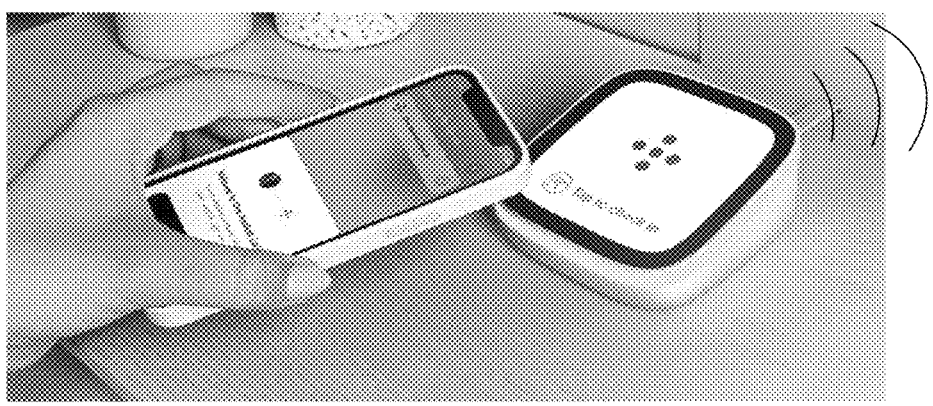

"You are now checked-in. Dr. Lee will be with you shortly."

"You are now checked-in. Your office is room A123."

FIG. 1B

"You vehicle is now enabled."

"Welcome to the Delta Sky Club. Please check the large display for flight boarding information."

FIG. 1C

"Please tap your phone here to verify your identification."

"Please tap your phone here and continue your rounds."

"Your desk is reserved until 3 O'clock today."

"Meeting in progress. Please contact Tee for any questions."

"Thanks for the Tips!"

"Tap me to tip me!"

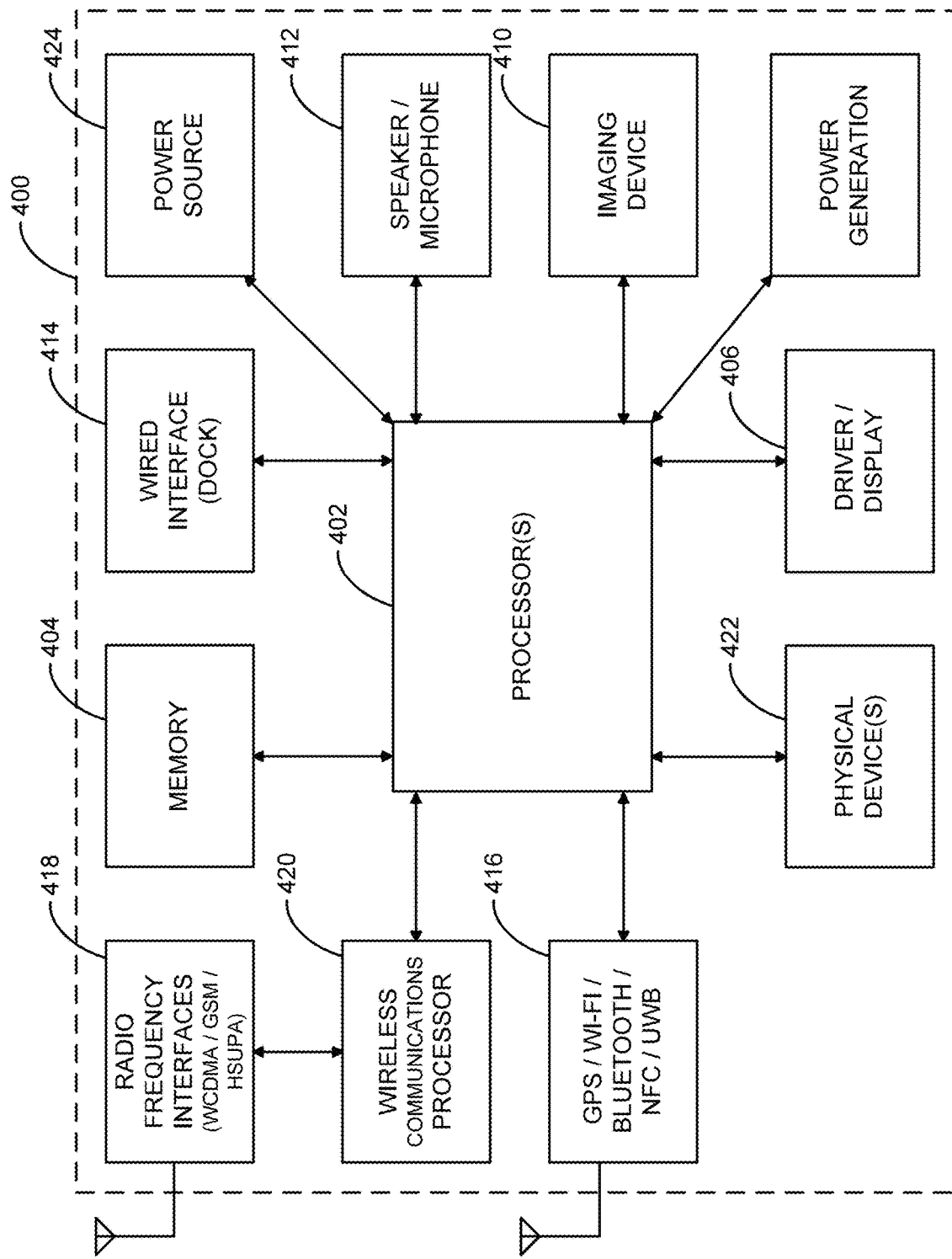

DISPLAY READER DEVICE AND METHODS

CROSS-REFERENCE TO RELATED APPLICATIONS

The present application claims priority to and is a non-provisional of U.S. Application No. 63/227,965 filed Jul. 30, 2021, and U.S. Application No. 63/227,950 filed Jul. 30, 2021. These applications are incorporated by reference herein, for all purposes.

BACKGROUND

The present invention relates to identity reader devices. More specifically, the present invention relates to identity reader devices providing improved end-user experience and functionality.

The inventors of the present invention realize that users of traditional proximity-based card-reader devices or locks, that are found almost everywhere, often appear as primitive, mysterious devices. More specifically, users are required to present their badges or smart devices as offerings to these devices and hope that they find the users' offerings pleasing. If appeased, the reader devices may illuminate a green LED, output a beep, unlatch a door or the like. If not appeased, there is often very little feedback or guidance given back to the user, for example, the reader devices may simply illuminate a red LED, output a buzz noise, or the like.

One problem with traditional reader devices is often there is no indication of what organization the reader devices is associated with. This is especially significant with shared or cooperative working spaces, where offices, meeting rooms, desks, and the like may be dynamically allocated to different companies throughout a day, week, or the like. Users may thus be confused why their badges or smart devices are not accepted by readers, because the readers and spaces are reallocated and associated with other parties.

Another problem is that there is no guidance given to users as to what to do if their badges or smart devices are turned down. As each entity that controls the operation of the reader devices, there is no consistent way that turned-down users can request assistance. For users who are employees, they will have to figure out the appropriate party in information systems or in facility management, or human resources who can help them with being turned-down. For non-employees, e.g. contractors or delivery services (e.g. DoorDash, Amazon), the problem is even worse, as they often do not know where to start in an organization to find out how to obtain access. The inventors imagine that an organization may use a sticker or label on a reader device that has text telling users who to contact in case of trouble. Such a solution is not considered workable as the information presented thereon may become out of date quickly. For example, e-mail messages may change or not be monitored, contact telephone numbers may change when responsible employees leave and the like. This is especially significant with distributed work forces where the responsible employees may be in different time zones or the like.

The above problems greatly detract from end-users' experiences. Accordingly, what are desired are apparatus and methods of operation that address the problems above.

SUMMARY

The present invention relates to a transaction system with reduced hardware-resource requirements. More specifically, the present invention relates to a transaction system wherein smart devices interacting with such systems require fewer hardware resources.

A display reader is disclosed that verifies identities of users and displays relevant data to the users. In some embodiments, the display reader advertises its presence via a short-range communications channel (e.g. UWB, BLE, Zigbee, NFC), and in response, the display reader receives beacon signals from smart devices (e.g. smart phone, smart ring, smart watch, or the like). The beacon signals may be ephemeral ID signals that are not permanently associated with the smart devices, to reduce the ability for smart devices to be tracked.

In some embodiments, in response to the ephemeral ID signals, the display reader sends reader-specific data and the ephemeral ID signals to a remote authentication service. The authentication server may maintain the current association between ephemeral ID signals and user accounts registered in the authentication service. The service then determines whether a user account associated with an ephemeral ID signal is approved to interact with the display reader. If so, the authentication server may return a data packet to the display reader.

In other embodiments, in response to the ephemeral ID signals, the display reader sends reader-specific data to the user's smart device, and in turn the user's smart device provides the reader data and a user identifier to the authentication service. Similar to the above, the service then determines whether a user account associated with an ephemeral ID signal is approved to interact with the display reader. If so, the authentication server returns a data packet (e.g. a signed token) to the smart device, which in turn may provide the data packet to the display reader. The display reader may then authenticate the token.

In various embodiments, the data packet may include data specific to the user (e.g. name, picture, etc.), specific to the user's purpose (e.g. schedule, room assignments, etc.), specific to the display reader location (e.g. occupancy, environmental conditions, etc.), specific to the area around the display reader (e.g. map or floorplan, security conditions, exit path, etc.), and the like. In other embodiments, if the user is not authorized to interact with the display reader, the data packet may include up-to-date guidance data for the user (e.g. telephone numbers to call, contact names, directions to locations, how to interact with the display reader, and the like).

Based upon this payload data, the display reader may display one or more images to the user, e.g. greetings, directions to particular locations, contact persons, how to obtain access, and the like. In some embodiments, the one or more images may be a keypad or the like, with which the user may enter a password or PIN.

In various embodiments, if the user is authenticated by the authentication server and authorized to interact with the display reader, and/or correctly enters a PIN, the display reader may take additional actions. Some actions include authorizing a coupled device to perform an action for the user, e.g. unlatch a door, lift a gate, activate a control panel, log into a service, provide directions, and the like.

In additional embodiments, the display reader is capable of accepting credentials from conventional RF badge readers, such as LF and HF cards.

According to one aspect, an identity reader device is disclosed. A device may include a first short-range transceiver of the identity reader device configured to output an advertisement signal to a plurality of smart devices including a first smart device, wherein the first short-range transceiver is configured to receive a plurality of ephemeral IDs from the plurality of smart devices, including a first ephemeral ID from the first smart device, wherein the first ephemeral ID is not permanently associated with a first user of the first smart device, and a network interface of the identity reader device configured to provide the plurality of ephemeral IDs, including the first ephemeral ID to a remote authentication service, wherein the network interface is also configured to receive a plurality of data from the remote authentication service. An apparatus may include a visual display configured to display one or more graphical user interfaces, and a processor of the identity reader device coupled to the first short-range transceiver, the network interface and the visual display, wherein the processor is configured to direct the visual display to display a first graphical user interface to the first user, in response to the plurality of data, wherein the processor is configured to determine whether the first user is authorized, and wherein the processor is configured to direct a peripheral device to perform an action, in response to determining that the first user is authorized.

According to another aspect, a method for an identity reader device is disclosed. One method may include providing with a first short-range transceiver of the identity reader device, an advertisement signal to a plurality of smart devices including a first smart device, and receiving with the first short-range transceiver, a plurality of IDs from the plurality of smart devices, including a first ID from the first smart device. A process may include providing with a network interface of the identity reader device, the plurality of ephemeral IDs, including the first ephemeral ID to a remote authentication service, receiving with the network interface, a plurality of data from the remote authentication service, in response to providing the plurality of ephemeral IDs, and determining with a processor of the identity reader device, whether the first user is authorized. A method may include generating with the processor, a first graphical user interface in response to the plurality of data and in response to determining that the first user is authorized, displaying with a visual display of the identity reader device, the first graphical user for the first user, and directing with the processor, a peripheral device to perform a user-initiated action, in response to determining that the first user is authorized.

According to another aspect, a method for an identity interface device is disclosed. One method may include providing with a first short-range transceiver of the identity interface device, an advertisement signal to a plurality of smart devices including a first smart device, receiving with the first short-range transceiver, a plurality of IDs from the plurality of smart devices, including a first ID from the first smart device, when the first smart device is greater than a threshold distance away from the identity interface device, and providing with a network interface of the identity interface device, the first ID and an identifier associated with the identity interface device to a remote authentication service, in response to the receiving the first ID from first smart device. A process may include receiving with the network interface, a plurality of data from the remote authentication service, in response to providing the first ID and the identifier to the remote authentication service, thereafter receiving with a second short-range transceiver of the identity interface device, communications from the first smart device when the first smart device is disposed less than the threshold distance away from the identity interface device, generating with a processor of the identity interface device, a first graphical user interface in response to the plurality of data and to the communications, and displaying under direction of the processor, the first graphical user interface on a visual display of the identity interface device.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIGS. 1A-1F illustrate a system diagram according to various embodiments;

FIG. 4 illustrates another flow diagram according to various embodiments.

DETAILED DESCRIPTION

Figure 1D:
Figure 1E:
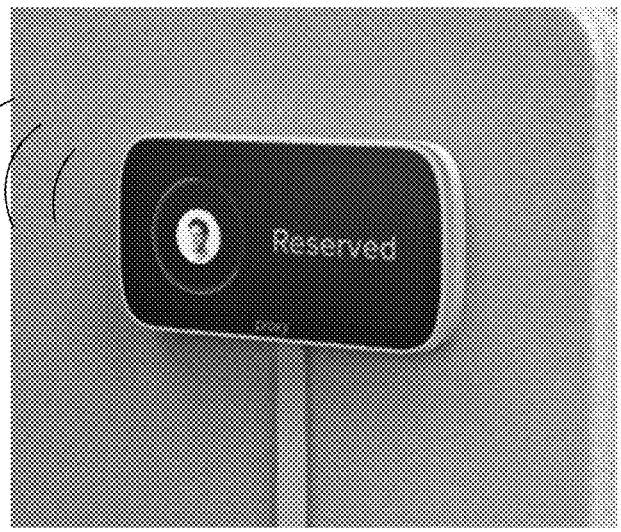
Figure 1F:
Figure 2A:
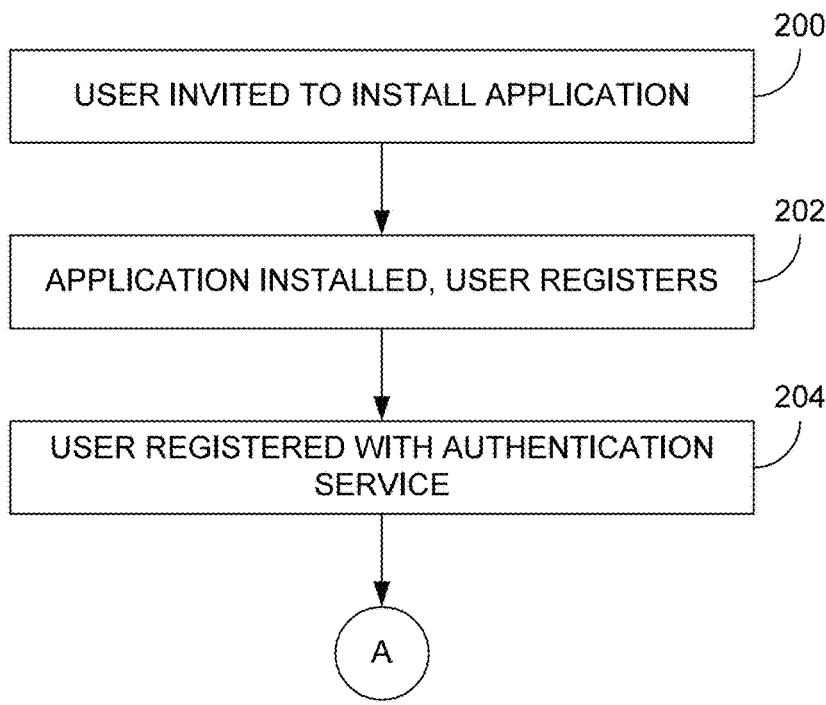
FIGS. 2A-D illustrate a flow diagram according to various embodiments.
Figure 2B:
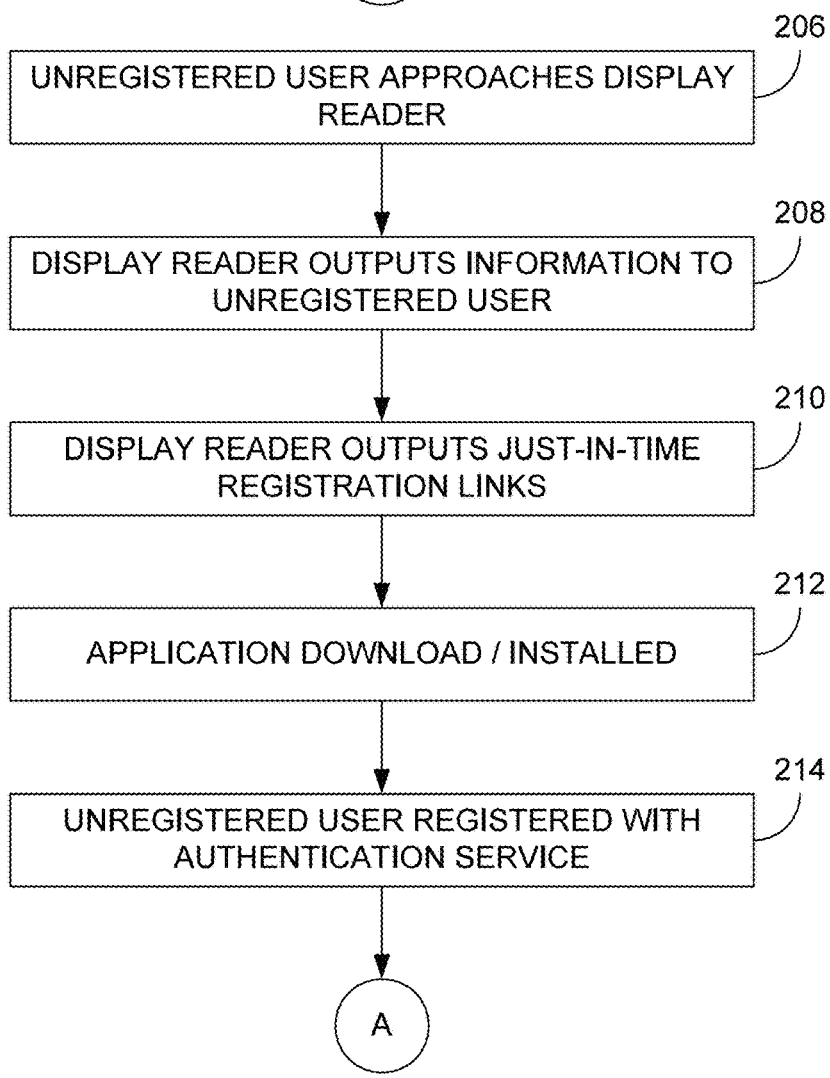
Figure 2C:
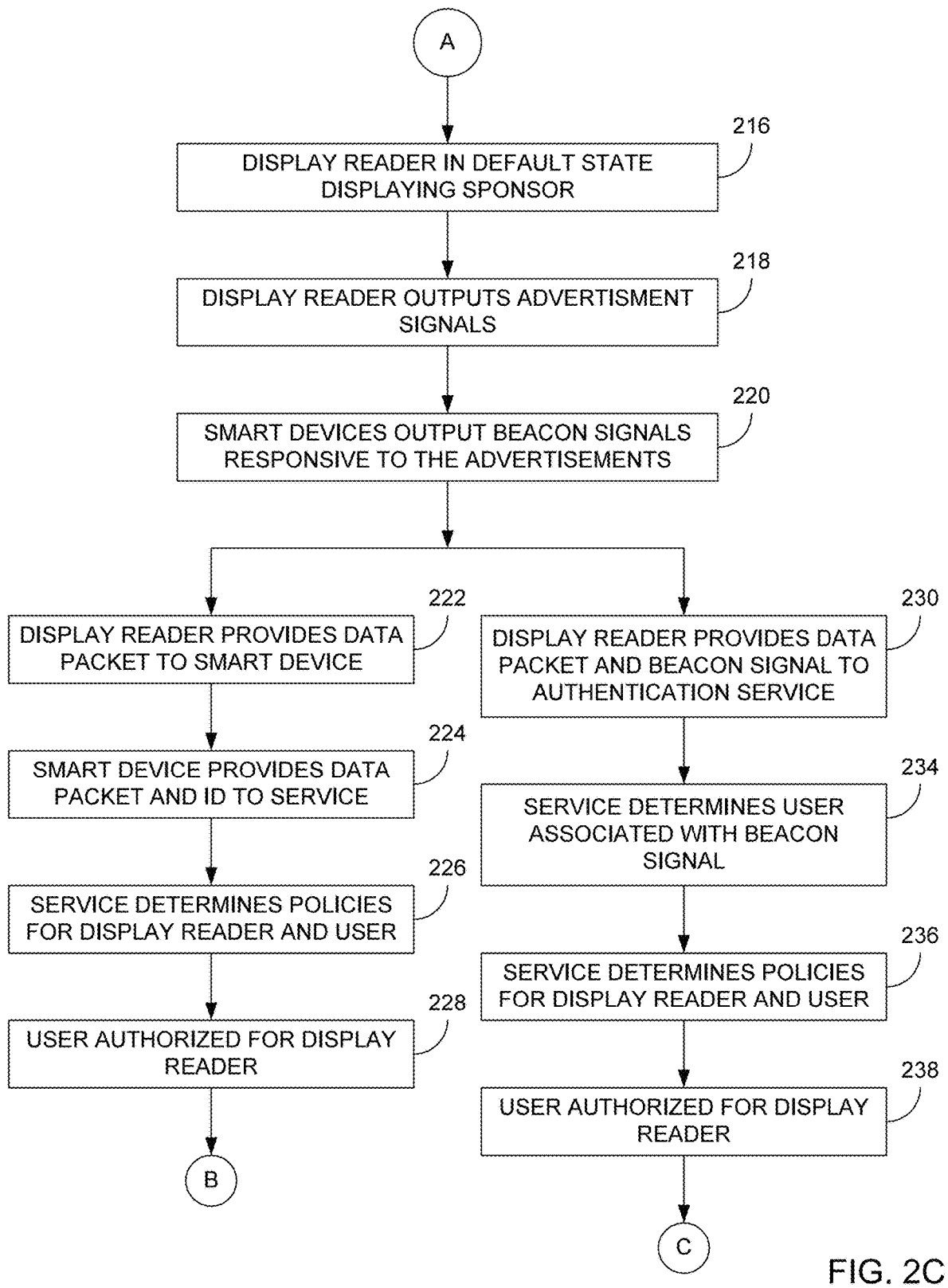
Figure 2D:
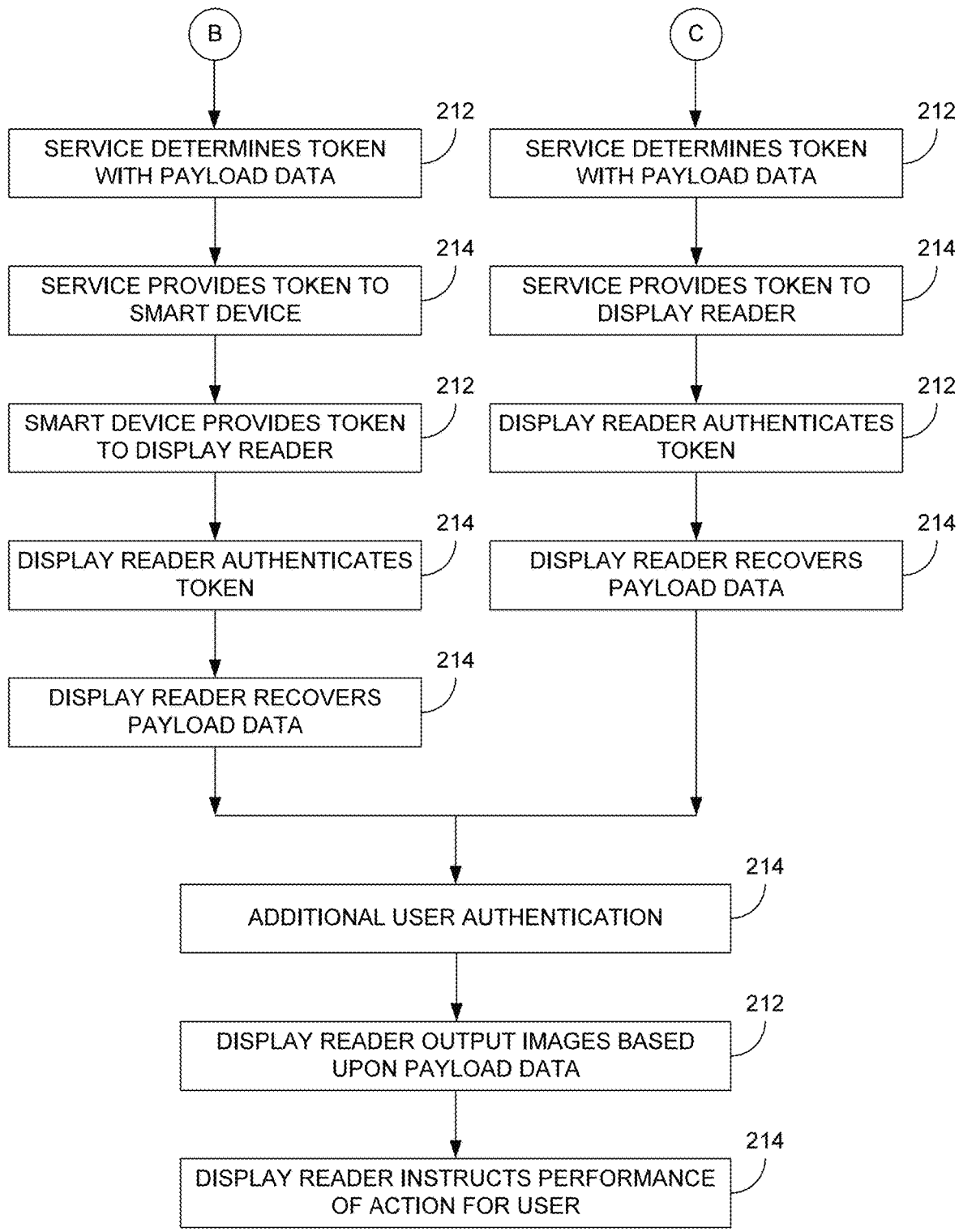

FIGS. 1A-1F illustrate some embodiments of the present invention. In particular, FIGS. 1A-1D illustrate reader devices including a dedicated informational display. FIG. 1A illustrates a reader device is configured to control a controlled-access point (e.g. as a security door latch, an automatic gate, etc.); FIGS. 1B and 1C illustrate reader devices used as service check-in devices (e.g. offices, appointments, clubs, membership desks, deliveries etc.); and FIGS. 1D-1F illustrate reader devices configured to verify a user identity (e.g. airport security, hotels, etc.). In light of the above, one of ordinary skill in the art will envision other applications that are within the contemplated and disclosed scope of the present patent disclosure. For example, embodiments may be applied to automobiles, vending machines, televisions, computing devices, and the like.

In various embodiments, the informational display may display data such: as the company or entity associated with the reader device, contact information if the user has more questions, instructions on how the user gains access to the asset or location, a seasonal greeting (e.g. Happy Halloween) and the like. In some embodiments, if a user is identified, the device may display custom data, such as a name of the user, a picture of the user, a schedule for the user, instructions for the user, a destination for the user, a custom sound greeting, birthday wishes, and the like. In other embodiments, the display may provide environmental or status data associated with the asset or location, for example, the display may indicate the temperature, the pressure, the percentage capacity, the number of people present, health risk levels, chemicals used or biological risk levels, etc. In some cases, the status data may also indicate emergency-type data, such as presence of a fire, where the closest exits are, existence of a safety situation (e.g. earthquake, flood, tornado), a police situation (e.g. active shooter, shelter in place instructions, etc.)

It some embodiments, the reader device may also serve as an input device. For example, the display may be a touch-sensitive display and present a keypad or other image that provides a challenge to the user. In response, the user may type-in a password or personal identification number, or the like. In another example, the device may allow the user to "Press to get help or get additional information." In some cases, a doorbell chime may be played inside the location for anyone to hear, a communications channel may be established with appropriate personnel, and the like. In response, the personnel may interact with the user via the reader device, for example, a voice connection may be provided between the reader device and the personnel.

In some embodiments, the reader display may provide instructions to the users so they can help themselves. For example, the user can perform actions on their phone, e.g. registers on the website, download and run a just-in-time application to request entry, to provide a payment, or the like. After registration, the reader device may then recognize the user as an authorized user. In one example, if a display reader is used for an Airline club entry, a passenger can walk up to the club they are not a member of, the display will provide the user with instructions on how to become a member or get a pass, the user may use their smart device to register with the Airline club and pay with their phone. After registration or payment, the display reader will recognize the user, and may display a green indication, display a checkmark, play a ding-type sound, or the like, to indicate acceptance of the user's identification.

FIGS. 2A-D illustrate methods of operation according to some embodiments of the present invention. In some embodiments, a user such as an employee may be invited by a company (organization, club, vendor, etc.) to download or install an application provided by the assignees of the present application. This may occur, before, during or after initial employee on-boarding. The user may then register for an account with an authentication service. In some embodiments, the authentication service will be provided by the assignees of the present application, via the application on the user's smart device (or a website on a desktop, tablet, etc.). It is contemplated that the company, organization, venue, or the like will also register with the authentication service to enable the herein-described functionality. In some embodiments, as part of the registration process, the user may provide user-identifiable information such as their e-mail address, phone number, name, and the like to the authentication service, via the application. Such data may be stored-securely on the authentication service.

After the processes described above, the user may be registered as an employee or contractor of a company, a member of a club, a subscriber to a service, a rental customer of a vehicle or location, or the like. If not already installed, the user may download and install the application described above upon the user's smart device, as described below. In some embodiments, the user may then be ready to interact with a display reader.

In some embodiments, it is contemplated that the user may register for the good, service or access associated with the display reader device in a just-in-time basis. In other words, only when the user actually interacts with a reader, as described herein, is the user/the user's smart device configured to interact with the reader. As merely an example, as a delivery person (e.g. food, packages, documents etc.) approaches a company entrance to deliver packages, the server may be given instructions as to how to obtain access. In some embodiments, the display reader may display a name, phone number of someone to call for help, or the like to contact; the display reader may instruct the server to press the display to initiate communications with someone who can assist them; and the like.

In other embodiments, the display reader may output a bar-code, or the like, which the server scans or photographs with their smart device. In various embodiments, the bar-code (including a URL, an application identifier, or the like) may be associated with a just-in-time download application.

In response to the bar-code, the user's smart device may be prompted to download the application from an app store, or the like. Once installed and running, the application on the user's smart phone may prompt the user to provide identifying data and to create an account with the application server, similar as described above. In various embodiments, once the user/user's smart device is registered with the application server, the user may interact with the display reader, as described herein. Further details of embodiments of a registration process are provided in FIG. 3, below.

In operation, the display reader may have a default idle state where it displays an image or name of a company or organization associated with the reader. Embodiments of this were illustrated in FIGS. 1B-1D, above. At the same time, the display reader may output advertisement signals (via communications transceivers), using BLE, UWB, or other short-range communications channels. These advertisement signals may be received by the user/user's smart device.

In various embodiments, when the advertisement signals reach a pre-determined threshold signal strength, the smart device may respond by outputting a beacon signal. In some embodiments, the beacon signal may be an ephemeral identification (ID) signal, meaning that the ephemeral ID is not necessarily associated with the user or the user's smart device over a long period of time, e.g. an hour, a day, or the like. In some examples, the ephemeral ID may be a Bluetooth MAC address. Because the ID is temporary, the user's interaction with the display reader, and other readers may not be tracked in many cases. In the below embodiments, two subsequent and different processes are illustrated and described.

In some embodiments, in response to the beacon signal from the user's smart device, the display reader may respond by providing the user's smart device a responsive data packet. This responsive communication may use the same short-range communications channel, or a different channel (e.g. BLE then UWB, UWB then NFC, etc.). In some embodiments, the data packet may include an identifier associated with the display reader and a random or pseudo random identifier.

In some embodiments, at least a portion of the data packet and a user identifier is sent from the user's smart device to the authentication service, described above. In response, the authentication service determines an entity (company, club, etc.) associated with The display reader, using the identifier of the display reader, to determine one or more policies associated with the entity. Additionally, the authentication service determines whether the user is authorized to interact with the display reader in response to the polices.

In some embodiments, if the user is authorized, the authentication service may determine a token or other encrypted data packet to send back to the user smart device. In some examples, the token may be encrypted using a private key associated with the authentication service. (The display reader may store the public key associated with the authentication service for decryption of the token.) In some embodiments the token may also include payload data associated with the user or the associated asset for display our other output from the display reader. More specifically, in some examples, the payload data may include: identifying data associated with the user, e.g. an image, a name, a personalized greeting, and the like; other data associated with the user, e.g. a schedule, a membership level, an asset identifier (e.g. car identifier, desk number, room number), options available and the like); and the like. In some examples, the payload data may include data associated with the asset, such as: environmental conditions, e.g. Air Quality Index (AQI), temperature, pressure, UV index, and the like; number of persons present, percentage occupancy, health risk assessment, and the like; hazardous condition warning, e.g. X-ray or other radiation in use, biological hazard warning, and the like; police or fire warning, e.g. active fire, exit locations and directions, lock-down conditions, and the like.

In various embodiments, the user smart device returns the token to the display reader, which authenticates the token. In some examples, authentication may include the display reader (e.g. processor) decrypting the token. If decryption is successful, the display reader may also recover a response number to see if it matches with the random or pseudorandom number it initially provided to the smart device, to see if time stamps of the token are within an expected time range (e.g. is not stale), and the like.

In some embodiments, if the payload data is successfully recovered, at least some portion of the payload data may be output to the user. As noted above, this output may include a display of information to the user on the display reader as disclosed above, may include an output of audio signals to the user (e.g. a "ding"), and the like.

In some embodiments the display reader may also communicate directly with the authentication service for transferring of some of the data described above. For example, in response to the beacon signal from the user's smart device, the user's smart device will output its ephemeral ID and user-identifiable information to the authentication service, and the display reader may provide the ephemeral ID of the user's smart device, along with a reader data packet to the authentication service, mentioned above. In some embodiments, the packet may include an identifier associated with the display reader and a random or pseudo random identifier. The output from the display reader to the authentication service may be via wireless (e.g. Wi-Fi, cellular, 5G, or the like) or wired connection (e.g. Ethernet, etc.).

In response, the authentication service determines an entity (company, club, etc.) associated with the display reader, using the identifier of the display reader, to determine one or more policies associated with the entity. Additionally, the authentication service determines the identifiable user data from the ephemeral ID. Then, the authentication service determines whether the user is authorized to interact with the display reader in response to the polices.

In some embodiments, if the user is authorized, the authentication service may determine a token or other encrypted data packet to send directly back to the display reader. In some examples, the token may be encrypted using a private key associated with the authentication service. (The display reader may store the public key associated with the authentication service for decryption of the token.)

As discussed above, in some embodiments the token or data packet may include payload data associated with the user or the associated asset for display our other output from the display reader. In some examples, the payload data may include: identifying data associated with the user, e.g. a company name and/or company title or rank associated with the user, a predetermined image, a personalized sound, and the like; other data associated with the user, e.g. a flight number, a seat number, a boarding class identifier, upgrades available, options available and the like; and the like. In some examples, the payload data may include data associated with the asset, such as: environmental conditions; number of persons present, percentage occupancy, health risk assessment, and the like; hazardous condition warning, e.g. X-ray or other radiation in use, biological hazard warning, and the like; police or fire warning, e.g. active fire, exit locations and directions, lock-down conditions, and the like.

In some examples, the display reader may authenticate the token or data packet by decrypting the token, or the like. If decryption is successful, the display reader may also recover a response number to see if it matches with the random or pseudorandom number it initially provided to the authentication service, to see if time stamps of the token are within an expected time range (e.g. is not stale), and the like.

In some embodiments, the display reader may output a request to the user for additional input (e.g. via displayed keypad). The additional input may include the user entering a PIN or password on the display reader, the user holding their smart device next to the display reader (e.g. as determined by UWB), the user holding their smart device near the display reader to establish NFC communications/authentication, the user speaking their name or providing other biometric data, the user unlocking their smart device or the application on their smart device (e.g. unlocking the smart device via biometrics, PIN, etc.).

In additional embodiments, the display reader may take additional actions in response to validating the token, the user successfully providing the additional input, the user entering a selection, or the like. Actions may include: directing a (peripheral) device to perform an action, such as: unlatching a door, activating a gate, unlatching a turnstile, providing a physical good, and the like. Actions may also include: activating a control panel, enabling a computing device (e.g. computer), logging a user into an account (e.g. a computer, a television, a smart hub, etc.), activating an automobile or other mobile device (e.g. scooter, bicycle), hailing a ride-share or other service, initiating an order for goods, and the like. Some types of actions may also dependent upon payload data, e.g. login credentials, user preferences, time of day, and the like. In such embodiments, the display reader may direct such peripheral devices via wireless communications means (e.g. Wi-Fi, cellular, 5G, etc.) or via wired connections (e.g. Ethernet).

As can be seen from the herein described embodiments, the display reader provides a level of user interaction that has not been provided by any conventional reader device. In various embodiments, by adding multiple short-range communications capability to reader devices provides a longer range sensing capability (e.g. BLE or UWB range) and a more accurate, shorter range sensing capability (e.g. UWB, NFC). Such embodiments allow a user's smart device to be recognized from farther distances and allows the various interactions with authentication service to begin processing. Additionally, they allow for secure triggering of the actions (e.g. directing a peripheral device to perform an action) for authorized users, only when they are within range (e.g. NFC range).

Additionally, the display provides a level of interaction to users that has not been provided by any conventional reader device. As described above, users now can be given up to date information regarding the display reader (e.g. sponsor), the conditions of the area controlled by the display reader (e.g. occupancy), the safety conditions of the building or location associated with the display reader (e.g. fire), and the like. Additionally, users not associated with the reader device can now receive information as to who to contact to get admission (e.g. front desk), instructions on how to get a good or service (e.g. download an app), where to go to deliver items (e.g. directions to receiving), and the like.

In one example, a display reader may be used in a movie-type environment. Some users may already be registered with a theater, and they can walk up to an admission area having the display readers. As the readers recognize the user, the member information may automatically pop up on the display, listing, for example the number of credits they have, promotions, and the like. The user may use the display reader to indicate the number of tickets they want to redeem or purchase, and that number of tickets is issued electronically or printed. If a user is not registered with the theater, they may be prompted to load and launch a just-in-time app, where they may register.

Figure 3:
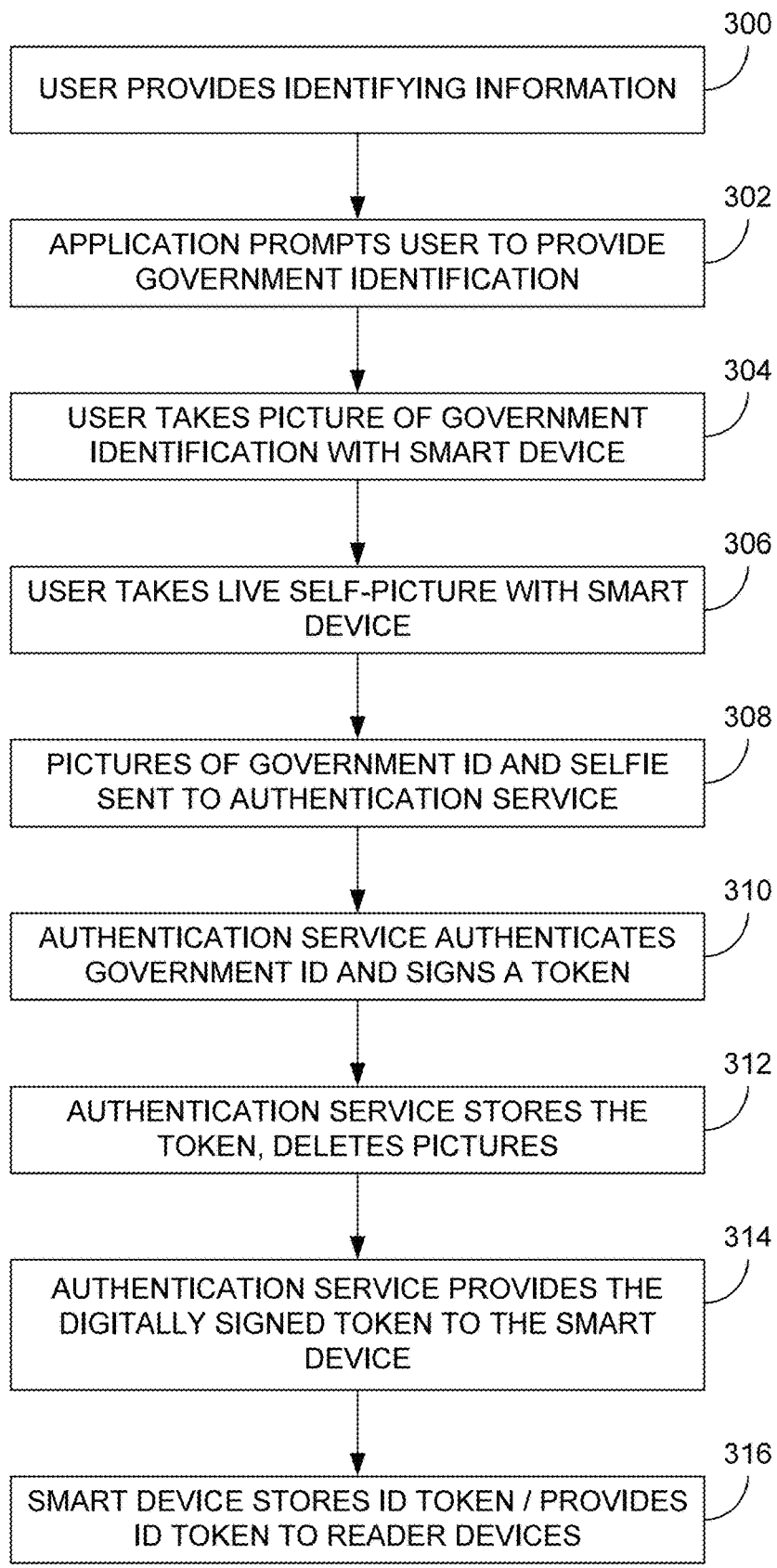
FIG. 3 illustrates another system diagram according to various embodiments.

FIG. 3 illustrates methods of operation according to some embodiments of the present invention. More particularly FIG. 3 illustrates more details of embodiments of the user registration process. As shown, the user provides personally identifying information such as their name, email address, phone number, and the like. Then the application (or website, etc.) may prompt the user to authenticate themselves via a government issued identification, such as a driver's license, passport, identity card, or the like. In these cases, the application may ask the user to take a photo of the official government identification along with one or more live or contemporaneous pictures of themselves. This newly acquired data may be sent to the authentication service for authentication, a third-party identification authentication service, or the like. Based upon known indicia of the government identifications, the person's picture, and the like, the governmental identification may be authenticated. It is contemplated that photos of the user and the government identification are maintained only on the user's smart phone (or tablet, etc.). It is also contemplated that such data are not permanently stored on the authentication service to maintain the user's privacy and also to reduce the risk of the authentication service being a target for hackers. Additionally, it greatly reduces the amount of data stored upon the authentication service, saving resources. Instead, the authentication service (and the user's smart device) may simply store an indication that the user's government identification information was authenticated. In other words, the authentication service is vouching that the user has presented an authentic government identification.

In various embodiments, the authentication of the governmental identification may be used by a company, organization, club, venue, or the like as a prerequisite to issuing a physical or electronic: employee identification, membership card, identification card, a good or a service, admission, or the like. As examples, as part of an employee on-boarding process, in the past, companies have taken an electronic copy of an employee's driver's license, passport, or the like to ensure the employee is able to be employed (e.g. they have a work visa, are a citizen, have a green card, or the like). This electronic copy is then typically stored on the company's servers, which takes-up server space, and makes the servers more likely to be attacked by hackers.

In some embodiments, the user's smart device (e.g. smart phone, smart ring, wearable device, etc.), may specifically provide the display reader with a token or status flag that is digitally signed by the authentication server indicating that the user's government ID has been authenticated. This digitally signed token may be required by the display reader from the user's smart device before or during interaction therebetween. In other embodiments, the fact that the user's smart device is providing specific employee credentials (e.g. electronic badge), may automatically indicate or assume that the government ID has been authenticated.

FIG. 4 illustrates a functional block diagram of various embodiments of the present invention. More specifically, it is contemplated that user smart devices (e.g. smart wearable devices, smart phones, tablets), computers (e.g. servers, laptops, etc.), cloud-based servers (e.g. hosting authentication services), display reader devices, etc. may be implemented with a subset or superset of the below illustrated components.

In FIG. 4, a computing device 400 may include some, but not necessarily all of the following components: an applications processor 402, memory 404, a display 406, an image acquisition device 410, audio input/output devices 412, and the like. Communications from and to computing device 400 can be provided by via a wired interface 414 (e.g. dock, plug, controller interface to peripheral devices); a GPS/Wi-Fi/Bluetooth interface/UWB 416; an NFC interface (e.g. antenna or coil) and driver 418; RF interfaces and drivers 420, and the like. Also included in some embodiments are physical sensors 422 (e.g. (MEMS-based) accelerometers, gyros, magnetometers, pressure sensors, temperature sensors, bioimaging sensors etc.).

In various embodiments, computing device 400 may be a computing device (e.g. Apple iPad, Microsoft Surface, Samsung Galaxy Note, an Android Tablet); a smart phone (e.g. Apple iPhone, Google Pixel, Samsung Galaxy S); a portable computer (e.g. netbook, laptop, convertible), a media player (e.g. Apple iPod); a reading device (e.g. Amazon Kindle); a fitness tracker (e.g. Fitbit, Apple Watch, Garmin or the like); a headset or glasses (e.g. Oculus Rift, HTC Vive, Sony PlaystationVR, Magic Leap, Microsoft HoloLens); a wearable device (e.g. Motiv smart ring, smart headphones); an implanted device (e.g. smart medical device), a point of service (POS) device, a server, a display reader provided by the assignee of the present patent disclosure, or the like. Typically, computing device 400 may include one or more processors 402. Such processors 402 may also be termed application processors, and may include a processor core, a video/graphics core, and other cores. Processors 402 may include processor from Apple (A13, A14), NVidia (Tegra), Intel (Core), Qualcomm (Snapdragon), Samsung (Exynos), ARM (Cortex), MIPS technology, a microcontroller, and the like. In some embodiments, processing accelerators may also be included, e.g. an AI accelerator, Google (Tensor processing unit), a GPU, or the like. It is contemplated that other existing and/or later-developed processors/microcontrollers may be used in various embodiments of the present invention.

In various embodiments, memory 404 may include different types of memory (including memory controllers), such as flash memory (e.g. NOR, NAND), SRAM, DDR SDRAM, or the like. Memory 404 may be fixed within computing device 400 and may also include removable memory (e.g. SD, SDHC, MMC, MINI SD, MICRO SD, CF, SIM). The above are examples of computer readable tangible media that may be used to store embodiments of the present invention, such as computer-executable software code (e.g. firmware, application programs), security applications, application data, operating system data, databases or the like. Additionally, in some embodiments, a secure device including secure memory and/or a secure processor are provided. It is contemplated that other existing and/or later-developed memory and memory technology may be used in various embodiments of the present invention.

In various embodiments, display 406 may be based upon a variety of later-developed or current display technology, including LED or OLED displays and/or status lights; touch screen technology (e.g. resistive displays, capacitive displays, optical sensor displays, electromagnetic resonance, or the like); and the like. Additionally, display 406 may include single touch or multiple-touch sensing capability. Any later-developed or conventional output display technology may be used for embodiments of the output display, such as LED IPS, OLED, Plasma, electronic ink (e.g. electrophoretic, electrowetting, interferometric modulating), or the like. In various embodiments, the resolution of such displays and the resolution of such touch sensors may be set based upon engineering or non-engineering factors (e.g. sales, marketing). In some embodiments, display 406 may integrated into computing device 400 or may be separate. In some embodiments, display 406 may be in virtually any size or resolution, such as a 4 K resolution display, a microdisplay, one or more individual status or communication lights, e.g. LEDs, or the like.

In some embodiments of the present invention, acquisition device 410 may include one or more sensors, drivers, lenses and the like. The sensors may be visible light, infrared, and/or UV sensitive sensors, ultrasonic sensors, or the like, that are based upon any later-developed or convention sensor technology, such as CMOS, CCD, or the like. In some embodiments of the present invention, image recognition algorithms, image processing algorithms or other software programs for operation upon processor 402, to process the acquired data. For example, such software may pair with enabled hardware to provide functionality such as: facial recognition (e.g. Face ID, head tracking, camera parameter control, or the like); fingerprint capture/analysis; blood vessel capture/analysis; iris scanning capture/analysis; otoacoustic emission (OAE) profiling and matching; and the like. In additional embodiments of the present invention, acquisition device 410 may provide user input data in the form of a selfie, biometric data, or the like.

In various embodiments, audio input/output 412 may include a microphone(s)/speakers. In various embodiments, voice processing and/or recognition software may be provided to applications processor 402 to enable the user to operate computing device 400 by stating voice commands. In various embodiments of the present invention, audio input 412 may provide user input data in the form of a spoken word or phrase, or the like, as described above. In some embodiments, audio input/output 412 may be integrated into computing device 400 or may be separate.

In various embodiments, wired interface 414 may be used to provide data or instruction transfers between computing device 400 and an external source, such as a computer, a remote server, a POS server, a local security server, a storage network, another computing device 400, a client device, a peripheral device to control (e.g. a security door latch, a turnstile latch, a gate, a status light, etc.), or the like. Embodiments may include any later-developed or conventional physical interface/protocol, such as: USB, micro USB, mini USB, USB-C, Firewire, Apple Lightning connector, Ethernet, POTS, custom dock, or the like. In some embodiments, wired interface 414 may also provide electrical power, or the like to power source 424, or the like. In other embodiments interface 414 may utilize close physical contact of device 400 to a dock for transfer of data, magnetic power, heat energy, light energy, laser energy or the like. Additionally, software that enables communications over such networks is typically provided.

In various embodiments, a wireless interface 416 may also be provided to provide wireless data transfers between computing device 400 and external sources, such as computers, storage networks, headphones, microphones, cameras, or the like. As illustrated in FIG. 4, wireless protocols may include Wi-Fi (e.g. IEEE 802.11 a/b/g/n, WiMAX), Bluetooth, Bluetooth Low Energy (BLE) IR, near field communication (NFC), ZigBee, Ultra-Wide Band (UWB), Wi-Fi, mesh communications, and the like.

GPS receiving capability may also be included in various embodiments of the present invention. As illustrated in FIG. 4, GPS functionality is included as part of wireless interface 416 merely for sake of convenience, although in implementation, such functionality may be performed by circuitry that is distinct from the Wi-Fi circuitry, the Bluetooth circuitry, and the like. In various embodiments of the present invention, GPS receiving hardware may provide user input data in the form of current GPS coordinates, or the like, as described above.

Additional wireless communications may be provided via RF interfaces in various embodiments. In various embodiments, RF interfaces 420 may support any future-developed or conventional radio frequency communications protocol, such as CDMA-based protocols (e.g. WCDMA), GSM-based protocols, HSUPA-based protocols, G4, G5, or the like. In some embodiments, various functionality is provided upon a single IC package, for example the Marvel PXA330 processor, and the like. As described above, data transmissions between a smart device and the services may occur via Wi-Fi, a mesh network, 4G, 4G, or the like.

Although the functional blocks in FIG. 4 are shown as being separate, it should be understood that the various functionality may be regrouped into different physical devices. For example, some processors 402 may include the Bluetooth functionality. Additionally, some functionality need not be included in some blocks, for example, GPS functionality need not be provided in a physical device implementing other functions illustrated in block 516. In various embodiments, any number of future developed, current operating systems, or custom operating systems may be supported, such as iPhone OS (e.g. iOS), Google Android, Linux, Windows, MacOS, or the like. In various embodiments of the present invention, the operating system may be a multi-threaded multi-tasking operating system. Accordingly, inputs and/or outputs from and to display 406 and inputs/or outputs to physical sensors 422 may be processed in parallel processing threads. In other embodiments, such events or outputs may be processed serially, or the like. Inputs and outputs from other functional blocks may also be processed in parallel or serially, in other embodiments of the present invention, such as acquisition device 410 and physical sensors 422.

In some embodiments of the present invention, physical sensors 422 (e.g. MEMS-based) may include accelerometers, gyros, magnetometers, pressure sensors, temperature sensors, imaging sensors (e.g. blood oxygen, heartbeat, blood vessel, iris data, etc.), thermometer, otoacoustic emission (OAE) testing hardware, and the like. The data from such sensors may be used to capture data associated with device 400, and a user of device 400. Such data may include physical motion data, pressure data, orientation data, or the like. Data captured by sensors 422 may be processed by software running upon processor 402 to determine characteristics of the user, e.g. gait, gesture performance data, or the like and used for user authentication purposes. In some embodiments, sensors 422 may also include physical output data, e.g. vibrations, pressures, and the like.

In some embodiments, a power supply 424 may be implemented with a battery (e.g. LiPo), ultracapacitor, or the like, that provides operating electrical power to device 400. In various embodiments, any number of power generation techniques may be utilized to supplement or even replace power supply 424, such as solar power, liquid metal power generation, thermoelectric engines, rf harvesting (e.g. NFC) or the like.

FIG. 4 is representative of components possible for a display reader, a smart device, an authentication service server, a transaction service server, and the like for embodying different embodiments. It will be readily apparent to one of ordinary skill in the art that many other hardware and software configurations are suitable for use with the present invention. Embodiments of the present invention may include at least some but need not include all of the functional blocks illustrated in FIG. 4. For example, a smart phone (e.g. access control device) configured to perform may of the functions described above includes most if not all of the illustrated functionality. As another example, a wearable device, e.g. a smart ring (electronic devices enclosed in a ring-shaped shell, enclosure, or form factor), may include some of the functional blocks in FIG. 4, but it need not include a high-resolution display 430 or a touch screen, a speaker/microphone 460, wired interfaces 470, or the like. In still other examples, a cloud-based server or a virtual machine (VM) may not include image acquisition device 412, MEMS devices 422, GPS capability 416, and the like, further components described above may be distributed among multiple computers, virtual machines, or the like. Additionally, a display reader may include an integrated display, may include multiple radios (e.g. multiple Bluetooth radios, multiple UWB radios, or the like) but not include power generation functionality.

Further embodiments can be envisioned to one of ordinary skill in the art after reading this disclosure. For example, in some embodiments, a wearable smart device may be a ring, a smart watch, a fitness tracker, smart glasses, smart earbuds or earphones, a smart earing, a patch worn on the skin, and the like. Additionally, the computing device (e.g. smart device) interacting with the wearable device may be a smart tablet, a smart phone, a computer, a control access system, and the like. In some embodiments, for authentication purposes, transaction service may record transactions using a block-chain technology for evidentiary purposes. Further, the cloud-based authentication service may provide service for one organization or multiple organizations and may be implemented as virtual machines, and the like. Additionally, different methods for providing user authentication are contemplated.

In other embodiments, combinations or sub-combinations of the above disclosed invention can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

We claim:

1. An identity reader device comprises:
   a first short-range transceiver of the identity reader device configured to output an advertisement signal to a plurality of smart devices including a first smart device, wherein the first short-range transceiver is configured to receive a plurality of ephemeral IDs from the plurality of smart devices, including a first ephemeral ID from the first smart device, wherein the first ephemeral ID is not permanently associated with a first user of the first smart device;
   a network interface of the identity reader device configured to provide the plurality of ephemeral IDs, including the first ephemeral ID to a remote authentication service, wherein the network interface is also configured to receive a plurality of data from the remote authentication service;
   a visual display configured to display one or more graphical user interfaces; and
   a processor of the identity reader device coupled to the first short-range transceiver, the network interface and the visual display, wherein the processor is configured to direct the visual display to display a first graphical user interface to the first user, in response to the plurality of data, wherein the processor is configured to determine whether the first user is authorized, and wherein the processor is configured to direct a peripheral device to perform an action, in response to determining that the first user is authorized.

2. The access control system of claim 1
   wherein the peripheral device comprises an electro-mechanical device or electrical device; and
   wherein the user-requested action is selected from a group consisting of: unlocking a door, opening a door, providing a good, changing a state of a vehicle, activating an appliance, activating a vending machine, unlocking a turnstile, unlocking a latch, opening a gate, activating a solenoid, activating or deactivating an electromagnet, activating a printer, unlocking a locker and modifying environmental conditions, activating a vehicle, controlling a display, displaying data, activating a signal light, turning on lights, modifying environmental controls, contacting a security system, logging into a service, enabling a computing device and enabling a control panel, initiating a transfer of funds, checking-in to a hotel, activating a rental, checking-in to an event, indicating presence at a location, enabling a vehicle.

3. The device of claim 1
   wherein the plurality of data comprises a plurality of user data associated with the first user;
   wherein the plurality of user data is selected from a group consisting of: an image of the first user, a name of the first user, an organization associated with the first user, a schedule associated with the first user, navigation directions associated with the first user; and
   wherein the visual display displays the first graphical user interface including the plurality of user data on the display.

4. The device of claim 1 wherein the plurality of data comprises a plurality of resource data associated with the identity reader.

5. The device of claim 4 wherein the plurality of resource data is selected from a group consisting of: environmental conditions of an area, occupancy of a room, hazard or risk warnings of a region, calendar-based data, time-based data, schedule-based data, event-based data, and a company name or logo.

6. The device of claim 4 further comprising:
   a speaker coupled to the processor, wherein the speaker is configured to provide audio message to the first user in response to the plurality of resource data;
   wherein the audio message is selected from a group consisting of: a salutation for the first user, audio instructions for the first user.

7. The device of claim 1 further comprising:
an NFC interface coupled to the processor, wherein the NFC interface is configured to receive credentials from the first user; and
wherein the processor is configured to determine whether the first user is authorized, in response to the credentials from the first user.

8. A method for an identity reader device comprises:
providing with a first short-range transceiver of the identity reader device, an advertisement signal to a plurality of smart devices including a first smart device;
receiving with the first short-range transceiver, a plurality of IDs from the plurality of smart devices, including a first ID from the first smart device;
providing with a network interface of the identity reader device, the plurality of ephemeral IDs, including the first ephemeral ID to a remote authentication service;
receiving with the network interface, a plurality of data from the remote authentication service, in response to providing the plurality of ephemeral IDs;
determining with a processor of the identity reader device, whether the first user is authorized, in response to at least a first portion of the plurality of data;
generating with the processor, a first graphical user interface in response to at least the second portion of the plurality of data and in response to determining that the first user is authorized;
displaying with a visual display of the identity reader device, the first graphical user for the first user;
directing with the processor, a peripheral device to perform a user-initiated action, in response to determining that the first user is authorized.

9. The method of claim 8
wherein the peripheral device comprises an electro-mechanical device; and
wherein the user-initiated action in the electro-mechanical device is selected from a group consisting of: unlocking a door, opening a door, providing a good, changing a state of a vehicle, activating an appliance, activating a vending machine, unlocking a turnstile, unlocking a latch, opening a gate, activating a solenoid, activating or deactivating an electromagnet, activating a printer, unlocking a locker and modifying environmental conditions, activating a vehicle.

10. The method claim 8
wherein the peripheral device comprises an electrical device; and
wherein the user-initiated action in the electrical device is selected from a group consisting of: controlling a display, displaying data, activating a signal light, turning on lights, modifying environmental controls, contacting a security system, logging into a service, enabling a computing device and enabling a control panel, initiating a transfer of funds, checking-in to a hotel, activating a rental, checking-in to an event, indicating presence at a location, enabling a vehicle.

11. The method of claim 8
wherein the plurality of data comprises a user data associated with the first user;
wherein the user data is selected from a group consisting of: an image of the first user, a name of the first user, an organization associated with the first user, a schedule associated with the first user, navigation directions associated with the first user;
wherein the method includes displaying with the visual display, the first graphical user interface including the user data; and wherein the plurality of data comprises resource data associated with the identity reader.

12. The method of claim 8 further comprising:
outputting with a speaker an audio message to the first user in response to the resource data; an
wherein the audio message is selected from a group consisting of: a salutation for the first user, audio instructions for the first user.

13. The method of claim 8 further comprising
displaying with the visual display, a second graphical user for the first user comprising a visual challenge for the first user;
receiving with an NFC interface credentials from the first user; and
determine with the processor, whether the first user is authorized, in response to the NFC credentials from the first user.

14. A method for an identity interface device comprises:
providing with a first short-range transceiver of the identity interface device, an advertisement signal to a plurality of smart devices including a first smart device;
receiving with the first short-range transceiver, a plurality of IDs from the plurality of smart devices, including a first ID from the first smart device, when the first smart device is greater than a threshold distance away from the identity interface device;
providing with a network interface of the identity interface device, the first ID and an identifier associated with the identity interface device to a remote authentication service, in response to the receiving the first ID from first smart device;
receiving with the network interface, a plurality of data from the remote authentication service, in response to providing the first ID and the identifier to the remote authentication service; thereafter
receiving with a second short-range transceiver of the identity interface device, communications from the first smart device when the first smart device is disposed less than the threshold distance away from the identity interface device;
generating with a processor of the identity interface device, a first graphical user interface in response to the plurality of data and to the communications; and
displaying under direction of the processor, the first graphical user interface on a visual display of the identity interface device.

15. The method of claim 14 further comprising directing with the processor, a peripheral device coupled to the identity interface device to perform a user-initiated action in response to the communications;
wherein the peripheral device comprises an electro-mechanical device or electrical device; and
wherein the user-initiated action is selected from a group consisting of: unlocking a door, opening a door, providing a good, changing a state of a vehicle, activating an appliance, activating a vending machine, unlocking a turnstile, unlocking a latch, opening a gate, activating a solenoid, activating or deactivating an electromagnet, activating a printer, unlocking a locker and modifying environmental conditions, activating a vehicle, controlling a display, displaying data, activating a signal light, turning on lights, modifying environmental controls, contacting a security system, logging into a service, enabling a computing device and enabling a control panel, initiating a transfer of funds, checking-in to a hotel, activating a rental, checking-in to an event, indicating presence at a location, enabling a vehicle.

16. The method of claim 14
wherein the plurality of data comprises resource data associated with the identity reader;
wherein the resource data is selected from a group consisting of: environmental conditions of an area, occupancy of a room, hazard or risk warnings of a region, conditions for entry; and
wherein the method includes displaying with the visual display, the first graphical user interface including the resource data.

17. The method of claim 16 further comprising:
outputting with a speaker of the identity interface device an audio message to the first user in response to the resource data; and
wherein the audio message is selected from a group consisting of: a salutation for the first user, audio instructions for the first user, an audio message associated with the first user.

18. The method of claim 14 further comprising
displaying with the visual display, a second graphical user for the first user comprising a request for the first user;
acquiring with a biometric acquisition device biometric data of the first user; and
determining with the processor, whether the first user is authorized, in response to the biometric data for the first user; and
wherein the displaying under direction of the processor, the first graphical user interface on the visual display of the identity interface device comprises displaying under direction of the processor, the first graphical user interface on the visual display of the identity interface device, in response to determining with the processor that the first user is authorized.

19. The method of claim 14 further comprising
capturing with an image capture device, images of a display of the first smart device having a visual image or code;
determining with the processor, whether the first user is authorized in response to the visual image or code; and
wherein the displaying under direction of the processor, the first graphical user interface on the visual display of the identity interface device comprises displaying under direction of the processor, the first graphical user interface on the visual display of the identity interface device, in response to determining with the processor that the first user is authorized.

20. The method of claim 14 further comprising:
receiving with an NFC interface credentials from the first user;
determine with the processor, whether the first user is authorized, in response to the NFC credentials from the first user; and
wherein the displaying under direction of the processor, the first graphical user interface on the visual display of the identity interface device comprises displaying under direction of the processor, the first graphical user interface on the visual display of the identity interface device, in response to determining with the processor that the first user is authorized.

* * * * *